US012808800B2

(12) United States Patent
Almaskeen et al.

(10) Patent No.: US 12,808,800 B2
(45) Date of Patent: Nov. 24, 2026

(54) VISUAL METHOD FOR GELATION DETECTION

(71) Applicant: SAUDI ARABIAN OIL COMPANY, Dhahran (SA)

(72) Inventors: Lyla Almaskeen, Dammam (SA); Abdulkareem AlSofi, Dhahran (SA); Limin Xu, Beijing (CN)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 657 days.

(21) Appl. No.: 18/001,507

(22) PCT Filed: May 5, 2022

(86) PCT No.: PCT/CN2022/090983

§ 371 (c)(1),
(2) Date: Dec. 12, 2022

(87) PCT Pub. No.: WO2023/212865

PCT Pub. Date: Nov. 9, 2023

(65) Prior Publication Data

US 2024/0102931 A1 Mar. 28, 2024

(51) Int. Cl.

| | |
|---|---|
| ***G01N 21/64*** | (2006.01) |
| ***C08J 3/075*** | (2006.01) |
| ***C08J 3/24*** | (2006.01) |

(52) U.S. Cl.

CPC ............ *G01N 21/643* (2013.01); *C08J 3/075* (2013.01); *C08J 3/248* (2013.01); *C08J 2333/26* (2013.01); *G01N 2021/6432* (2013.01)

(58) Field of Classification Search
None
See application file for complete search history.

(56) References Cited

U.S. PATENT DOCUMENTS 5,194,197 A 3/1993 Munk et al.

FOREIGN PATENT DOCUMENTS

| | | |
|---|---|---|
| CN | 110564093 A | 12/2019 |
| CN | 113185550 A | 7/2021 |
| JP | 2001174391 A | 6/2001 |

OTHER PUBLICATIONS

Zama, Y. et al. Gelation and luminescence of lanthanide hydrogels formed with deuterium oxide, RSC Adv., 2019, 9, 1949-1955 (Year: 2019).*

(Continued)

*Primary Examiner* — Xiaoyun R Xu
(74) *Attorney, Agent, or Firm* — Osha Bergman Watanabe & Burton LLP

(57) ABSTRACT

A method includes providing a gelant including a cross-linkable polymer, a crosslinking agent and an aqueous fluid, adding one or more fluorescent rare earth elements to the gelant to provide a fluorescent gelant solution in which a fluorescence emission is quenched, and initiating crosslinking of the gelant to form a gel by heating the fluorescent gelant solution. The intensity of the fluorescence emission of the fluorescent gelant solution is monitored as an indicator of gelation status and a gelation point of the gelant may be identified based on the intensity of the fluorescent emission of the fluorescent gelant solution.

9 Claims, 2 Drawing Sheets

(56) References Cited

OTHER PUBLICATIONS

Bryant, S. et al. Laboratory evaluation of phenol-formaldehyde/polymer gelants for high-temperature applications, Journal of Petroleum Science and Engineering 17 (1997) 197-209 (Year: 1997).*
Song and Wang, "Phase transition of poly (N-isopropylacrylamide) hydrogels determined by fluorescence probe technique," Journal of Beijing University of Chemical Technology, Dec. 31, 2002, pp. 48-51, 4 pages.
Wang et al., "Monitoring of Formation Process of Nanocomposite Hydrogels with Pyrene Fluorescence Probe," Journal of South China University of Technology, Dec. 31, 2012, pp. 123-127, 6 pages.
Wang et al., "Study on preparation and dynamic property of chitosan hydrogels," Food & Machinery, Decmeber 31, 2008, pp. 25-27, 4 pages.
International Search Report and Written Opinion issued in corresponding PCT Application No. PCT/CN2022/090983, mailed Feb. 8, 2023, 9 pages.

* cited by examiner

VISUAL METHOD FOR GELATION DETECTION

BACKGROUND

Conformance improvement technologies may be utilized to overcome the difficulties posed by variable permeability reservoirs by enhancing the uniformity of a reservoir and improving sweep efficiency in enhanced oil recovery (EOR). The use of polymer gels (or polymer waterflooding) is one of the most promising conformance improvement techniques. In flow diverting applications, a polymer gel may be placed in high permeability zones, diverting the subsequent injected water to lower permeability zones of a reservoir. In water shutoff applications, a gelant may be injected through production wells to block or reduce any unwanted excess water and/or gas production. Generally, a polymer solution containing a crosslinker (gelant) is injected into the formation and, after a certain time (known as the gelation time), gelation occurs in the formation. Gelation time can be used to determine the gel quality, and accordingly, the proper application for the gel. Gelation time is often determined via bottle tests, in which samples are placed in an oven and taken out periodically to determine gelation status. Accordingly, there exists a need for a gelation detection method that provides continuous monitoring of the gelant.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method that includes providing a gelant including a cross-linkable polymer, a crosslinking agent and an aqueous fluid, adding one or more fluorescent rare earth elements to the gelant to provide a fluorescent gelant solution in which a fluorescence emission is quenched, and initiating crosslinking of the gelant to form a gel by heating the fluorescent gelant solution. The method then includes monitoring an intensity of the fluorescence emission of the fluorescent gelant solution as an indicator of gelation status and identifying a gelation point of the gelant based the intensity of the fluorescent emission of the fluorescent gelant solution.

In another aspect, embodiments disclosed herein relate to a method that includes providing a gelant that comprises a cross-linkable polymer, a crosslinking agent, and an aqueous fluid, adding one or more water-soluble organic dyes to the gelant, thereby providing a fluorescent gelant solution, and initiating crosslinking of the gelant to form a gel by heating the fluorescent gelant solution. Then, the method includes monitoring a decrease in intensity of the fluorescence emission of the fluorescent gelant solution as an indicator of gelation status and identifying the gelation point of the gelant based on the intensity of the fluorescence emission of the fluorescent gelant solution.

Other aspects and advantages of the claimed subject matter will be apparent from the following description and the appended claims.

DETAILED DESCRIPTION

Figure 1:
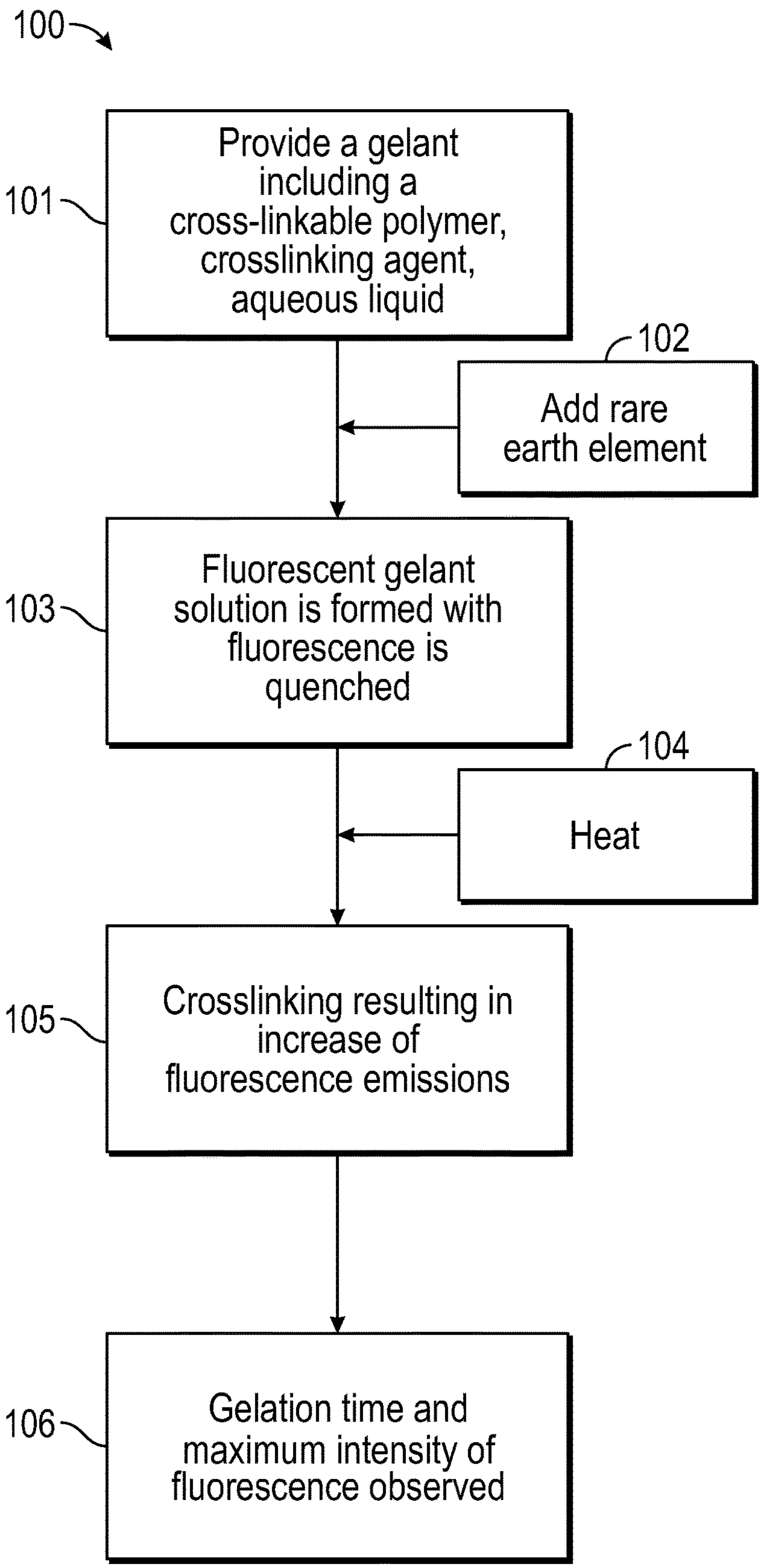
FIG. 1 is a block flow diagram of a method in accordance with one or more embodiments.

One or more embodiments of the present disclosure relate to a visual methodology to detect gelation time of a gelant. Conventional methods for measuring gelation time typically involve periodic sample analysis to determine if gelation has occurred, such as by removing a gelant from heat and analyzing its degree of gelation. However, such techniques do not enable continuous monitoring of a sample or provide highly accurate results. In contrast, methods in accordance with the present disclosure provide facile, continuous, and accurate monitoring of gelation using fluorescence as an indicator. The visual methodology for monitoring gelation may include monitoring the fluorescent emissions of a gelant solution comprising one or more fluorophores to detect the gelation time. Thus, embodiments disclosed herein relate to methods that provide continuous monitoring of gelation progress.

Methods in accordance with the present disclosure include monitoring the fluorescence of a gelant solution that includes one or more fluorophore. Fluorescence refers to a form of luminescence that may emit light when ultraviolet light or other electromagnetic radiation is absorbed. For example, when ultraviolet light is absorbed by a fluorescent compound (also referred to as a fluorophore), the fluorescent compound may emit visible light, which may be referred to as fluorescent light. Thus, as used herein, a fluorophore is a compound that emits visible light when it absorbs electromagnetic radiation. Suitable fluorophores are those that emit fluorescence at a known wavelength on the spectrum of visible light (i.e., from about 400 to about 700 nanometers). As may be appreciated by those skilled in the art, fluorophores having different wavelengths of emission may be chosen to distinguish different fluorophores.

In one or more embodiments, methods for gelation detection include providing a gelant that comprises a cross-linkable polymer, a crosslinking agent, and an aqueous fluid. One or more fluorophores may be added to the gelant, providing a fluorescent gelant solution, and subsequent crosslinking of the polymer is initiated. Upon crosslinking, the fluorescence is monitored to determine the gelation time of the gelant. In some embodiments, the fluorophore is a rare earth element. In other embodiments, the fluorophore is a water-soluble organic dye.

Gelant Composition

As described above, embodiment methods for gelation detection include providing a gelant that comprises a cross-linkable polymer, a crosslinking agent, and an aqueous fluid. The cross-linkable polymer of one or more embodiments is not particularly limited, and may be any suitable water-soluble cross-linkable polymer known to a person of ordinary skill in the art. The cross-linkable polymer may be chosen based on desired properties of the resultant gel. The cross-linkable polymer of one or more embodiments may be a synthetic polymer or a biopolymer. The cross-linkable polymer may be linear or branched. The cross-linkable polymer may be functionalized by a variety of functional groups such as, for example, a sulfonate. A person of ordinary skill in the art will, with the benefit of this disclosure, appreciate that the choice of cross-linkable polymer will influence the properties of the resulting gel.

In one or more embodiments, the cross-linkable polymer may be derived from monomers selected from the group consisting of acrylamides, acrylates, acetamides, formamides, saccharides, and derivatives thereof. The cross-linkable polymer may be a homopolymer or a copolymer. A copolymer refers to a polymer derived from more than one species of monomer, whereas a homopolymer is derived from only one species of monomer. For example, the cross-linkable polymer may be one or more of a polyacrylamide, copolymers of acrylamide and acrylate, copolymers of acrylamide tertiary butyl sulfonate (ATBS) and acrylamides, and copolymers of acrylamide, acrylic acid and ATBS, carboxymethyl cellulose (CMC), carboxymethylhydroxyethyl cellulose (CMHEC), and xanthan gum. In one or more particular embodiments, the cross-linkable polymer may be a partially hydrolyzed polyacrylamide or a sulfonated polyacrylamide.

In one or more embodiments, the cross-linkable polymer may have a molecular weight ranging from about 2,000 to about 20,000 kDa (kilodaltons). For example, the cross-linkable polymer may have a molecular weight range having a lower limit of any of 2,000, 4,000, 6,000, 8,000, and 10,000 kDa and an upper limit of any of 12,000, 14,000, 16,000, 18,000, and 20,000 kDa, where any lower limit can be used in combination with any mathematically compatible upper limit.

In one or more embodiments, the cross-linkable polymer may have a degree of polymerization ranging from about 20,000 to about 300,000. For example, the cross-linkable polymer may have a degree of polymerization having a lower limit of any of 20,000, 50,000, 100,000 and 150,000 and an upper limit of any of 150,000, 200,000, 250,000 and 300,000, where any lower limit can be used in combination with any mathematically compatible upper limit.

The gelant of one or more embodiments may comprise the cross-linkable polymer in an amount ranging from about 1,000 to 10,000 ppm (parts per million). For example, the cross-linkable polymer may be present in the gelant in an amount having a lower limit of any of 1,000, 2,000, 3,000, 4,000, and 5,000 ppm and an upper limit of any of 6,000, 7,000, 8,000, 9,000, and 10,000 ppm, where any lower limit can be used in combination with any mathematically compatible upper limit.

Embodiment gelants also include a crosslinking agent. Crosslinking agents are used to bond carbon atoms from different polymer chains to transform viscous, linear segments into a crosslinked gel. Accordingly, the identity of the crosslinking agent included in the gelant may affect its gelation in various ways. The crosslinking agent of one or more embodiments is not particularly limited, and may be any suitable crosslinking agent that is known to a person of ordinary skill in the art. The crosslinking agent may be an organic crosslinking agent or an inorganic crosslinking agent. Exemplary organic crosslinking agents include hydroquinone (HQ), hexamethylenetetramine (HMTA), phenol, formaldehyde, resorcinol, and terephthalaldehyde, among others. Inorganic crosslinking agents of one or more embodiments may be multivalent cations such as Cr(III), Al(III), Ti(III), and Zr(IV), among others. In some embodiments, multiple crosslinking agents may be included in a gelant composition. For example, gelants of one or more embodiments may include 2 crosslinking agents or more.

The gelant of one or more embodiments may comprise a crosslinking agent in an amount ranging from 20 to 10,000 ppm. For example, the gelant may contain a crosslinking agent in an amount having a lower limit of any of 20, 50, 100, 500, 1,000, and 2,000 ppm and an upper limit of any of 5,000, 6,000, 7,000, 8,000, 9,000, and 10,000 ppm, where any lower limit can be used in combination with any mathematically compatible upper limit.

Gelants of one or more embodiments also comprise an aqueous fluid. The aqueous fluid may include at least one of natural and synthetic water, fresh water, seawater, brine, brackish, formation, production water, and mixtures thereof. The aqueous fluid may be fresh water that is formulated to contain various salts. The salts may include, but are not limited to, alkali metal and alkaline earth metal halides, hydroxides, carbonates, bicarbonates, sulfates, and phosphates. In one or more embodiments, the aqueous fluid may be a brine. The brine may be any of seawater, aqueous solutions where the salt concentration is less than that of seawater, or aqueous solutions where the salt concentration is greater than that of seawater. Salts that may be found in brine include salts that produce disassociated ions of sodium, calcium, aluminum, magnesium, potassium, strontium, lithium, halides, carbonates, bicarbonates, sulfates, chlorates, bromates, nitrates, oxides, and phosphates, among others. In some embodiments, the brine may include one or more of an alkali metal halide, an alkali metal sulfate salt, an alkaline earth metal halide, and an alkali metal bicarbonate salt. In particular embodiments, the brine may comprise any of sodium chloride, calcium chloride, magnesium chloride, sodium sulfate, and sodium bicarbonate. Any of the aforementioned salts may be included in brine.

One or more embodiment methods include adding a fluorophore to the gelant described above to provide a fluorescent gelant solution. In some embodiments, the fluorophore may be a rare earth element. Various rare earth elements exhibit fluorescence in the spectrum of visible light, between 400 and 700 nm, upon excitation. Any rare earth element may be included, provided that it exhibits sufficient fluorescence and gel formation is not inhibited by its inclusion. Suitable rare earth elements for use in methods of the present disclosure include, but are not limited to, Europium ($Eu^{3+}$), Terbium ($Tb^{3+}$), Erbium ($Er^{3+}$), Dysprosium ($Dy^{3+}$), Samarium ($Sm^{3+}$), Promethium ($Pm^{3+}$), Neodyminium ($Nd^{3+}$), and combinations thereof. In one or more particular embodiments, the rare earth element is $Eu^{3+}$.

The amount of rare earth element that may be added to the gelant may be relative to the concentration of cross-linkable polymer. In some embodiments, one or more rare earth elements may be added to the gelant in an amount ranging from 500 ppm to 3,000 ppm. For example, a rare earth element may be included in the gelant solution in an amount having a lower limit of any of 500, 750, 1,000, 1,250, and 1,500 ppm and an upper limit of any of 1,500, 2,000, 2,500, 2,750, and 3,000 ppm, where any lower limit may be used in combination with any mathematically compatible upper limit.

Alternatively, in one or more embodiments, the fluorophore may be a water-soluble organic dye. Any suitable water-soluble organic dye may be included, provided that gelation is not inhibited by its inclusion. For example, embodiments may include water-soluble organic dyes such as R-Phycoerhythrin, Alexa Fluor™ Plus 555 Phalloidin, Alexa Fluor 546, among others, and combinations thereof. As will be appreciated by a person with skill in the art, specific water-soluble organic dyes may be chosen based on a desired specific fluorescence emission.

The amount of water-soluble organic dye that may be added to the gelant may be relative to the concentration of cross-linkable polymer. In some embodiments, one or more water-soluble organic dyes may be added to the gelant in an amount ranging from 50 to 5,000 ppm. For example, a water-soluble organic dye may be included in an amount having a lower limit of any of 50, 100, 200, 500, and 1,000 ppm and an upper limit of any of 1,000, 2,000, 3,000, 4,000, and 5,000 ppm, where any lower limit may be used in combination with any mathematically compatible upper limit.

Methods of Gelation Detection

FIG. 1 depicts an embodiment method 100 that includes adding a rare earth element 102 to a gelant 101 to provide a fluorescent gelant solution 103. At this time, the gelant solution may exhibit minimal to no fluorescence due to the water molecules in the aqueous fluid of the gelant coordinating to open binding sites of the rare earth element.

After addition of the rare earth element 102 to the gelant, the fluorescent gelant solution may be heated 104, resulting in initiation of crosslinking of the cross-linkable polymer via the crosslinking agent (also referred to as gelation) 105. During gelation, the cross-linkable polymer may coordinate with the rare earth element, replacing the water molecules at the open binding sites of the rare earth element. Coordination of the polymer to the rare earth element results in an increased intensity of fluorescence emission, as it is no longer being quenched by water molecules, and in turn, indicates gelation status of the gelant. In such methods, the gelation time may be identified by observing the maximum intensity of the fluorescence emission 106.

As described above, in one or more embodiments, the gelation of the fluorescent gelant solution may be carried out at elevated temperature. The fluorescent gelant solution may be heated in an oven for a period of time to produce a gel. The gelation temperature may range from about 70 to 110° C. For example, gelation may be monitored at a temperature having a lower limit of any of 70, 75, 80, 85, and 90° C. and an upper limit of any of 90, 95, 100, 105, and 110° C., where any lower limit may be used in combination with any mathematically compatible upper limit.

As described above, the fluorescent gelant solution may be heated for a period of time to provide a gel. The period of time sufficient to provide a gel may be dependent on various factors such as the specific type and concentration of the cross-linkable polymer used, the specific type and concentration of the crosslinking agent used, and the temperature. The gelation time may range from a few minutes to several days. Specific gelant variables may be chosen so as to achieve a specific gelation time.

Gelation time may be determined by monitoring the change in fluorescence emissions of the fluorescent gelant solution. In some embodiments, methods may include using a high temperature camera placed in the oven with the fluorescent gelant solution to continuously monitor the gelation. The onset of gelation may be identified by a change in fluorescence intensity. Accordingly, methods disclosed herein may provide qualitative measurements of gelation. On the other hand, by plotting the intensity of fluorescence over time, methods disclosed herein may provide the exact gelation point of embodiment gelant solutions. Such quantitative measurements may be facilitated by installing image analysis software on the high temperature camera so as to process and translate visual observations of fluorescence to numerical values and/or graphs.

In one or more embodiments in which the fluorophore is a rare earth element, the high temperature of the oven may affect the overall fluorescence intensity of the gelant solution. However, the temperature is maintained throughout the entire gelation, so any decrease in fluorescence would be apparent from start to end of the gelation.

As described above, one or more embodiments may include continuous monitoring of the gelant with a high temperature camera. The high temperature camera may be placed in a heating device, such as an oven with the fluorescent gelant solution. In the oven, the camera may be set to continuously record the fluorescence emissions of the fluorescent gelant solution. Alternatively, the camera may be set to take pictures of the fluorescence emissions at regular intervals to monitor the gelation.

Figure 2:
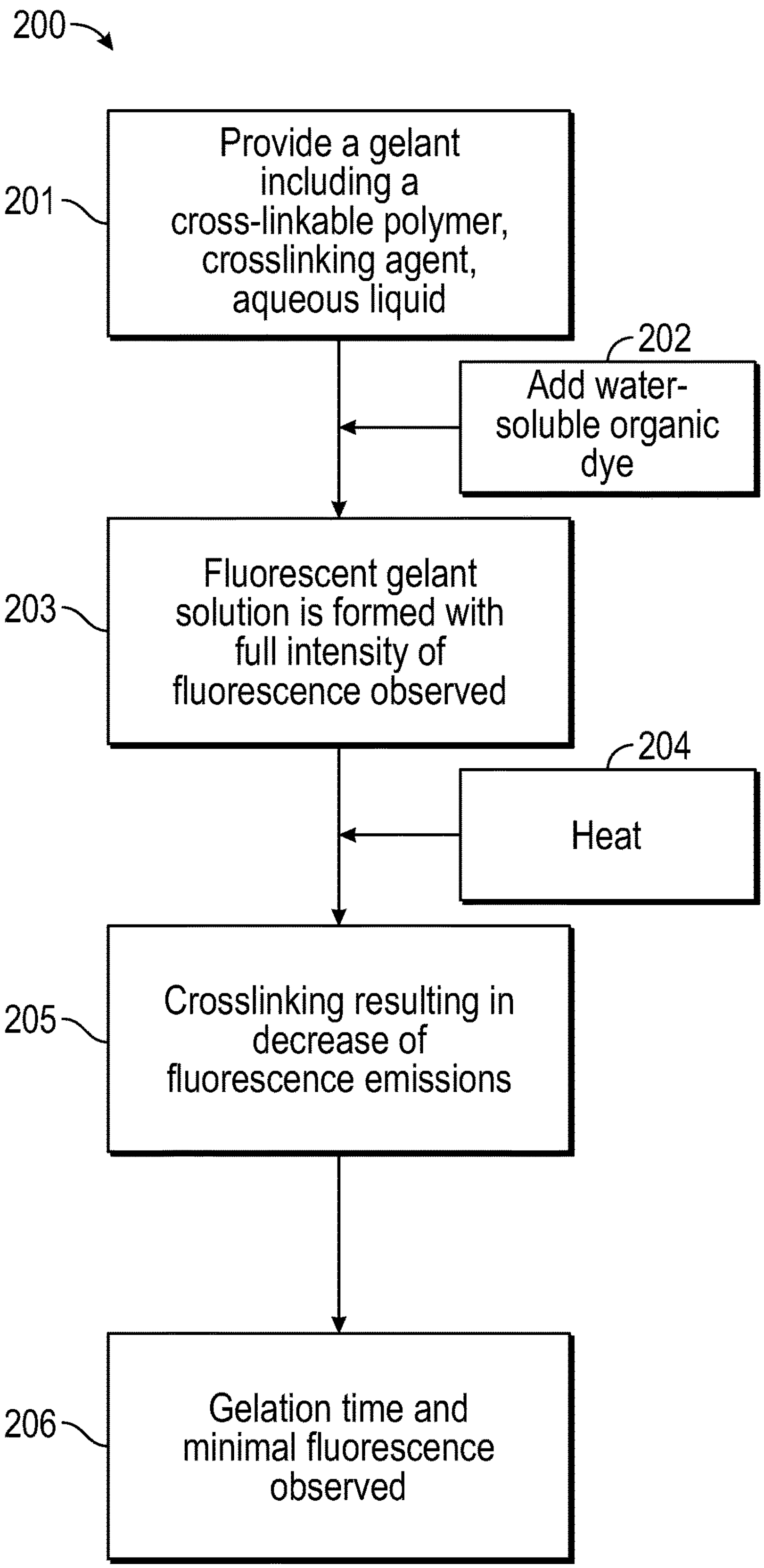
FIG. 2 is a block flow diagram of a method in accordance with one or more embodiments.

In one or more embodiments, and as shown in FIG. 2, a method 200 that includes the addition of a water-soluble organic dye 202 to a gelant 201, may provide a fluorescent gelant solution 203 with a specific fluorescent emission wavelength, dictated by the choice of organic dye. In contrast to the rare earth element described above, the organic dye fluoresces initially when mixed with the gelant solution providing an initial fluorescence intensity.

The fluorescent gelant solution may be heated 204, initiating crosslinking 205 of the cross-linkable polymer via the crosslinking agent. The heating times and temperatures may be the same as described above with regard to the gelation method using the rare earth element. As noted above, the heating time may be dependent on the variables of the specific gelant composition. The crosslinking 205 may result in the polymer absorbing a specific emission wavelength. The emission wavelength that is absorbed by crosslinking may be dictated by the choice of cross-linkable polymer and crosslinking agent, as different structures may result in different emission absorption. Accordingly, the absorbed emission wavelength due to crosslinking 205 may be chosen to be similar to that of the emission wavelength of the organic dye in the fluorescent gelant solution. As such, during gelation of the gelant solution, the fluorescence of the organic dye will decrease 205, as it is being absorbed by the crosslinked polymer. Thus, gelation progress may be monitored qualitatively via the decrease in fluorescence emission intensity 206. According to method 200, the gelation point may be correlated with the time at which the solution reaches a minimum fluorescence intensity. As noted above, the exact gelation point may be determined quantitatively using image analysis software installed on the high temperature camera.

For example, in one or more particular embodiments, formation of a gel via crosslinking of a gelant including partially hydrolyzed polyacrylamide and Cr' results in emission absorption at 570 nm. In such embodiments, methods may include providing a fluorescent gelant solution that has an emission wavelength ranging from about 550 to about 590 nm. For example, the fluorescence emission of a particular gelant solution may be 570 nm. As the particular fluorescent gelant solution is heated and crosslinking progresses, the intensity of the fluorescent emission at 570 nm will decrease, thus indicating gelation.

Applications

Embodiments of the present disclosure may provide at least one of the following advantages. Methods in accordance with the present disclosure provide visual monitoring of gelation progress. Visual monitoring of gelation offers an easy, precise and continuous method for the monitoring of gelation time, a key screening parameter in developing potential gel formulations. As such, this method may be useful in determining gelation time during displacement tests performed in transparent porous media such a Hele-Shaw cells, micromodels, and glass columns.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method comprising:

providing a gelant that comprises a cross-linkable polymer, a crosslinking agent and an aqueous fluid;

adding one or more rare earth elements to the gelant to provide a fluorescent gelant solution, in which a fluorescence emission is quenched;

initiating crosslinking of the gelant to form a gel by heating the fluorescent gelant solution in an oven;

continuously monitoring an intensity of the fluorescence emission of the fluorescent gelant solution as an indicator of gelation status, wherein the continuous monitoring is conducted using a high temperature camera installed in the oven;

identifying an onset of gelation by a change in intensity of the fluorescent emission of the fluorescent gelant solution; and identifying a gelation time of the gelant based on a maximum intensity of the fluorescent emission of the fluorescent gelant solution.

2. The method of claim 1, wherein the rare earth element is selected from the group consisting of Europium ($Eu^{3+}$), Terbium ($Tb^{3+}$), Erbium ($Er^{3+}$), Dysprosium ($Dy^{3+}$), Samarium ($Sm^{3+}$), Promethium ($Pm^{3+}$), Neodymium ($Nd^{3+}$), and combinations thereof.

3. The method of claim 1, wherein the rare earth element is Europium ($Eu^{3+}$).

4. The method of claim 1, wherein the cross-linkable polymer is selected from the group consisting of polyacrylamide, copolymers of acrylamide and acrylate, copolymers of acrylamide tertiary butyl sulfonate (ATBS) and acrylamides, copolymers of acrylamide, acrylic acid and ATBS, carboxymethyl cellulose (CMC), carboxymethylhydroxyethyl cellulose (CMHEC), and xanthan gum, and combinations thereof.

5. The method of claim 1, wherein the crosslinking agent is an organic crosslinking agent selected from the group consisting of hydroquinone (HQ), hexamethylenetetramine (HMTA), phenol, formaldehyde, resorcinol, and terephthalaldehyde, and combinations thereof.

6. The method of claim 1, wherein the crosslinking agent is an inorganic crosslinking agent selected from the group consisting of Cr(III), Al(III), Ti(III), Zr(IV), and combinations thereof.

7. The method of claim 1, wherein the rare earth element is present in an amount of 1,000 to 10,000 ppm.

8. The method of claim 1, wherein the crosslinking agent is present in an amount of 20 to 10,000 ppm.

9. The method of claim 1, comprising plotting the intensity of the fluorescent emission over time to identify the gelation point.

* * * * *